July 29, 1952     G. P. BOSOMWORTH     2,604,666
MANUFACTURE OF CELLULAR RUBBER
Filed May 2, 1947                     2 SHEETS—SHEET 2
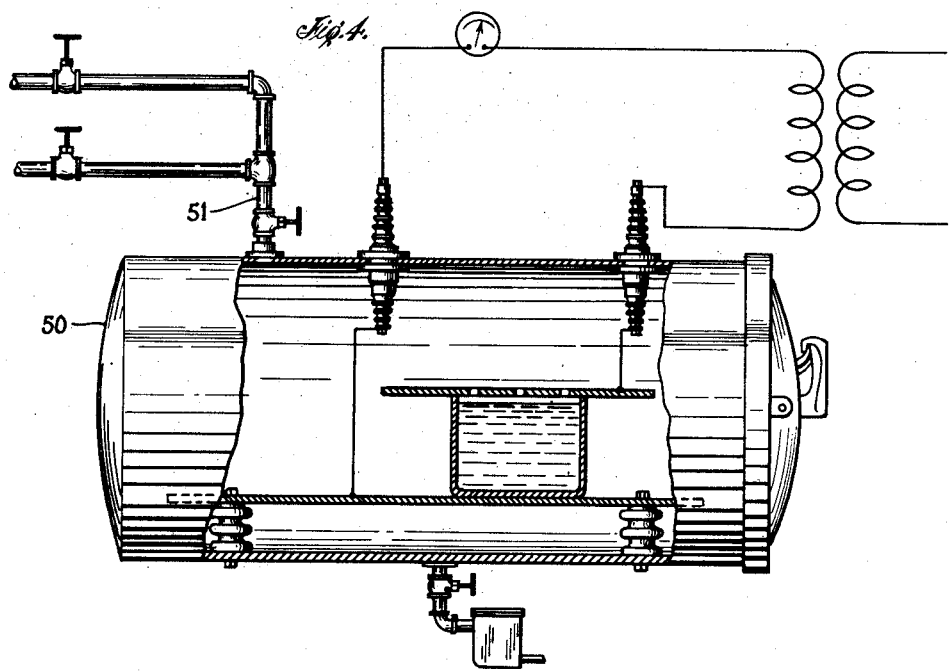
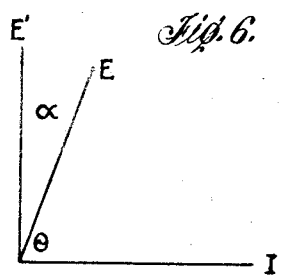
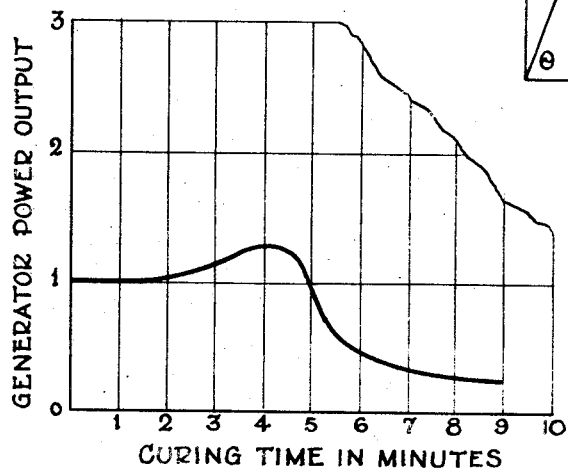
INVENTOR
GEORGE P. BOSOMWORTH
BY Ely T. Frye
ATTORNEYS Patented July 29, 1952

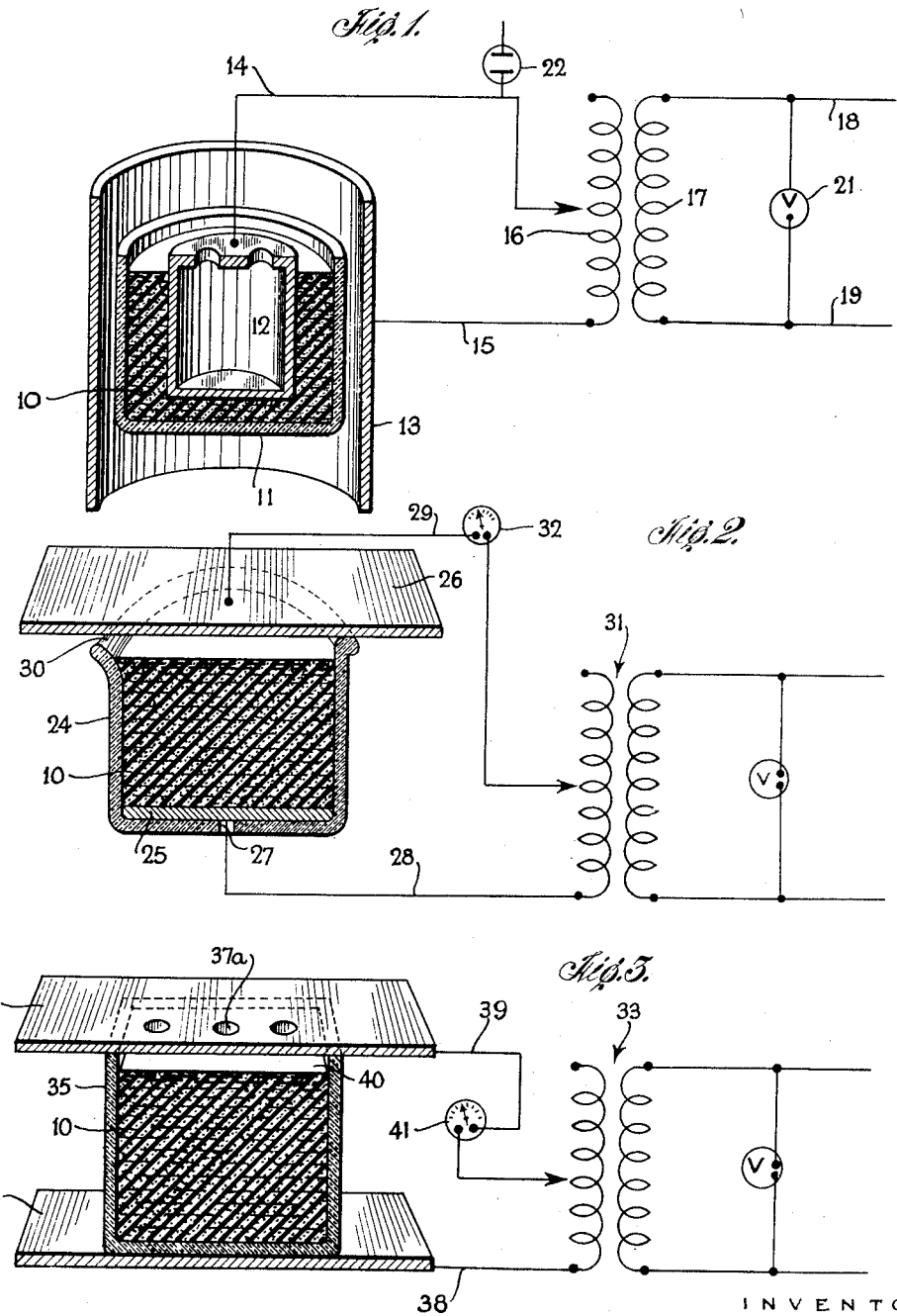

2,604,666

UNITED STATES PATENT OFFICE 2,604,666

MANUFACTURE OF CELLULAR RUBBER

George P. Bosomworth, Akron, Ohio, assignor to The Firestone Tire & Rubber Company, Akron, Ohio, a corporation of Ohio Application May 2, 1947, Serial No. 745,549

2 Claims. (Cl. 18—53)

This invention relates to high frequency electronic curing or vulcanization of cellular rubber articles made directly from an aqueous dispersion of rubber or the like.

Cellular rubber articles have heretofore been commercially manufactured directly from foamed or frothed rubber latex. Such articles were generally of a porous construction so as to allow "breathing" of the article when it was used as a cushion. In general, such articles were manufactured by first compounding a concentrated latex, frothing the latex, as by beating it vigorously, pouring the froth into a suitable mold, allowing the froth to gel in the mold to a wet cellular article, and then curing or vulcanizing the gelled article by heating the mold in hot water or steam for approximately 30 to 60 minutes. The vulcanized sponge rubber was then washed thoroughly with water and dried.

Since this prior commercial curing process depended upon the slow transfer of heat from the mold inwardly through the wet cellular rubber in order to vulcanize the rubber, it is readily apparent why the manufacture of sponge rubber articles by that process was often unsatisfactory on account of various technical difficulties and limitations as to the size and quality of the product obtainable. Attempts to manufacture very thick articles often resulted in many failures attributable to the fact that the heat penetrated through the article at a rather slow rate. When steam was used as the heating medium, there was great danger of over-curing the surfaces of the sponge article in order to obtain a complete cure of the interior thereof. In attempting to reduce the curing cycle by increasing the temperature of the heating medium, the reduction in curing time necessary to prevent overcuring of the outer surfaces frequently resulted in the interior being left under-cured. For these reasons, it was often found necessary to lower the temperature and increase the time of curing, as by heating the article in hot water, in order to obtain a fairly evenly vulcanized sponge rubber article.

Heretofore, in order to produce a reasonable quantity of cellular products equipment of very large size involving the use of excessively large floor space was required. In addition, there was involved a substantial amount of hand labor and time in sealing and opening the steam curing chambers, when that type of vulcanizing equipment was used, and in charging and discharging molds from either steam or water curing chambers. Also, the scrap ran very high, contributing to the extremely high cost of commercial sponge rubber articles. For these and other reasons, latex sponge rubber mattresses and cushions were not seriously competitive with padded steel spring cushions of the more conventional types.

It is an object of the present invention to provide a method and apparatus for curing or vulcanizing a wet sponge rubber structure in less time and with less labor than has heretofore been required. Another object is to provide a method of manufacturing cellular rubber articles having uniform properties and being free from both under-curing and over-curing. Another object is to provide a more economical process and apparatus for manufacturing sponge rubber products. The above and further objects will be manifest from the description of the invention which follows, reference being had to the accompanying drawings in which:

Fig. 1 is a schematic drawing of one form of apparatus of the invention, in vertical section;

Fig. 2 is a similar drawing of another embodiment of the invention;

Fig. 3 represents an additional embodiment of the invention;

Fig. 4 is an elevation, partially in section, of apparatus for treating material under controlled pressure and temperature conditions;

Fig. 5 is a graph illustrating a typical change in power absorbed by the material under treatment as vulcanization progresses; and Fig. 6 is a vector diagram showing voltage and current relation in a condenser.

The invention fulfills the objects hereof by providing apparatus and a method of curing a foamed rubber latex in an electrical field created between two electrodes of a high frequency circuit. The preferred frequencies applicable in the practice of this invention include those in and above the radio spectrum in the neighborhood of from one megacycle to one thousand megacycles per second. The method of the invention may be applied to frothed or foamed latices or aqueous dispersions of natural rubber, any of the synthetic rubbers, or similar materials of a rubbery nature capable of being vulcanized or cured by heat to form an elastic product. Among the synthetic rubbers which may be utilized are butadiene-styrene copolymer, butadiene-acrylonitrile copolymer, neoprene, polybutadiene, butyl rubber (copolymer of isobutylene with a conjugated diolefin) and combinations of these rubbers. Also, any of the current natural or synthetic rubbers may be used alone or in combination with any of the rubbers just mentioned. The invention may also be employed in the vulcanization of unfrothed latex mixtures and compounds of milled rubber, such as crepe or smoked sheet. The invention is also applicable to thermo-setting resins or plastics. In order to simplify the description of the invention, specific reference hereafter will be made only to the manufacture of a cellular rubber article from natural rubber latex, unfrothed latex and smoked sheet rubber, although it will be understood that the invention may equally well be applied to the manufacture of any of the other materials above mentioned, as it will be readily understood by one skilled in the art.

Referring to the drawings in detail, Fig. 1 shows a receptacle or mold 11 suitable for holding frothed latex or wet gelled sponge rubber 10 to be cured or vulcanized in accordance with the present invention. The mold material should have electrical insulating characteristics such that it will not break down under the high electrical stress necessary in carrying out the invention. It should be a poor thermal radiator. It is preferable that the mold material be chosen to have electrical and thermal properties, the combined effects of which substantially match the material being cured. The changes in those properties of the mold material resulting from changes in temperature, frequency of applied electrical energy, chemical composition, loss factor, or other variables in process, should in the aggregate preferably match similar changes in the work.

To properly match the properties of the mold and the work, it will be necessary to compute the power density (dielectric loss per unit volume) by the equation Power density $= 1.41 f(E')^2 e''$ watts/cu. in.   (1)

where $f$ = frequency in megacycles per second
$E'$ = voltage gradient in kilovolts/inch
$e''$ = loss factor In the equation it will be seen that the power density is determined solely by the frequency and voltage gradient of the applied electrical energy and by the loss factor $e''$ of the material being processed. This value of power density is determined as follows:

"Loss factor" is defined as the power factor times the dielectric constant K of the material in question. The latter figure is either known and obtainable from reference tables, or is obtainable in a known manner, as through the use of a radio frequency bridge.

In a perfect condenser the current vector I leads the voltage vector E' by 90°, as shown graphically in Fig. 6, and there is no power absorption; however, in actual practice the voltage across the condenser plates takes some position such as making an angle $\theta$ with the current vector I. The power absorbed, $P_a$, by the material between the plates of a condenser, manifests itself as heat and molecular activity and is given by the equation $$P_a = EI \cos \theta \quad (2)$$

and the apparent power by $$P = EI \quad (3)$$

where $E$ = Voltage across condenser plates,
$I$ = Current in the circuit.

The power factor is the ratio of power absorbed to apparent power; then $$\frac{P_a}{P} = \frac{EI \cos \theta}{EI} = \cos \theta$$

Since $90° - \theta = \alpha$, $\sin \alpha = \cos \theta$, and where $\alpha$ is small (as in dielectric heating) and radians, $\sin \alpha = \alpha$; therefor Power factor $= \alpha$ and Loss factor $e'' = K\alpha$ The power density in the dielectric material is the amount of power absorbed by the material per unit volume and may be computed as follows:

Referring to Equation 2, $P_a = EI \cos \theta$ and substituting $\alpha$ for $\cos \theta$ $$P_a = EI\alpha \quad (4)$$

Since the capacity C of a parallel plate condenser is given by $$C = mK\frac{A}{d} \quad (5)$$

where $m$ = a constant depending on system of units
$A$ = area of one plate
$d$ = distance between plates
$K$ = dielectric constant
$Ad$ the volume of the interelectrode space
and $\frac{P_a}{Ad}$ = power absorbed per unit volume = power density.

Since, in a charged condenser $$I = 2\pi f EC \quad (6)$$

where $f$ = frequency of applied power
$C$ = total capacity of condenser
$E$ = applied voltage substituting in Equation 6, the values of C in Equation 5

$$I = 2\pi f E m K \frac{A}{d}$$

substituting this value of I in Equation 4

$$P_a = 2\pi f E^2 m K \frac{A}{d} \alpha \quad (7)$$

Rearranging and dividing each side by $Ad$ $$\frac{P_a}{Ad} = 2\pi f \left(\frac{E}{d}\right)^2 m K \alpha \quad (8)$$

Substituting the system of units $f$ = frequency in megacycles per second
$E' = \frac{E}{d}$ = Voltage gradient in kilovolts per inch
$e'' = K\alpha$ = loss factor
Power density $= 1.41 f(E')^2 e''$ Watts/cu. in.

which is power density Formula 1.

Accordingly, mold 11 may be glass or other suitable electrically non-conducting material, such as a ceramic material, thermosetting plastics, hard vulcanized natural or synthetic rubber and molded fibrous materials, such as fibrous materials impregnated with synthetic resins and/or plastics, and certain combinations of metallic element with associated insulating material. The mold material should be so selected that aggregate effects of its electrical and thermal properties match those of the rubber or plastic compound to be cured, and also match these properties as they change during the process.

Shown positioned within mold 11 and surrounded by frothed latex is an internal electrode 12 of a conducting material, such as metal. Electrode 12 is disposed within a cup-shaped electrode 13, the latter electrode extending a substantial distance above and below mold 11 for a purpose hereinafter discussed. Electrodes 12 and 13 are connected by conductors 14 and 15, respectively, to the secondary winding 16 of a suitable electrical impedance matching unit, one of said conductors being adapted to be selectively connected to taps on the secondary winding to match the impedance characteristics of the load. The primary 17 of the impedance matching unit is connected, by means of conductors 18 and 19 constituting a transmission line, a suitable source of high frequency electric power (not shown). It will be understood that instead of coupling the secondary winding 16 to the primary 17 of the impedance matching device, winding 16 could be coupled directly to the tank coil of the high frequency oscillator. A voltmeter 21 is placed across conductors 18 and 19 as an aid in regulating the high frequency power applied to mold 11. A neon tube 22 is connected to or placed near conductor 14 to give an approximate indication of the match between the load and the transmission line, and thereby to aid in tuning the load circuit to resonance with the generator. The electrodes 12 and 13 and the intervening frothed latex 10 constitute a condenser with the latex to be treated serving as the dielectric. The impedances are so adjusted that the load circuit is tuned to resonance with the generator circuit when the latex is in the incompletely treated unvulcanized condition.

As will be seen hereinafter, a wet, unvulcanized sponge rubber composition may be cured in mold 11 in an extremely short period of time on the application of a high frequency electrical field to electrodes 12 and 13. The cure of the sponge rubber article is remarkably uniform throughout. One reason for the uniform cure is that the alternating electrical field affects the interior of the rubber material to substantially the same extent as it does the surface portions, and during the same periods of time. This uniform curing results from the peculiar arrangement shown in Fig. 1, wherein outer electrode 13 extends a substantial distance above and below the mold 11, so that an intense, substantially uniform electrical field is established between electrodes 12 and 13, through the sponge rubber material. Thus, electrode 13 must extend a sufficient distance above and below mold 11 to provide a substantially uniform electrical field through all portions of the rubber material.

Another embodiment of the invention is shown in Fig. 2, wherein a mold 24 of glass or other nonconducting material is provided with an electrode 25 placed in the bottom of the mold and an electrode 26 over the top of the mold and out of contact with the rubber material to be treated within the mold. An opening 27 is provided through the bottom of the mold for connection of electrode 25 to a conductor 28. Electrode 26 is directly connected to the secondary of an impedance matching device 31 by means of conductor 29 while electrode 25 is similarly connected by conductor 28. A radio frequency ammeter 32 may be placed in the conductor 29 for the purpose of indicating the match between the load circuit and the generator circuit. Note that electrode 25 fits sufficiently close to the bottom of mold 24 to prevent any leakage of liquid through opening 27 in the mold. If desired, the electrode 25 may be sealed in the bottom of the mold by a water-resistant cement or the like. Electrode 26 extends laterally approximately 50% of the perpendicular distance between electrodes 25 and 26 beyond the upper margin of mold 24 in order to establish an electrical field of substantially uniform maximum intensity throughout all the rubber material contained in mold 24 when the electrodes are energized. The arrangement is such that the intensity of the electrical field at the lateral surface of the rubber material is as great as that of the field through the center thereof. Since considerable steam will be generated as a result of this electrical curing operation, the mold shown in Fig. 2 has a pouring lip 30 which provides an opening to the atmosphere between the edge of the mold and the electrode 26, which permits the escape of steam from the mold 24. Alternatively, the electrode 26 may be made of screen wire to permit the free escape of steam or vapor. By means of apparatus as shown in Fig. 2, completely cured natural rubber cellular articles have been manufactured in a small fraction of the time conventionally required for the curing of celluar rubber articles by the application of heat externally as by merely heating in hot water or steam.

A third embodiment of the invention is shown in Fig. 3, wherein a mold 35 of glass or equivalent material rests upon a bottom electrode 36, and is provided with a top electrode 37 substantially parallel to electrode 36. In order to be certain of an electrical field of substantially uniform intensity, electrodes 36 and 37 extend laterally beyond the sides of the mold a distance approximately equal to 50% of the perpendicular distance between the said electrodes. In this embodiment it will be noted that neither electrode touches the rubber material to be vulcanized within mold 35. In the apparatus shown in this figure, as in the apparatus of the preceding figures, it is desirable that the air space at the top of the mold be held to a minimum (but greater than the arcing distance for the voltage employed) in order to provide a most efficient operation of the apparatus. Holes 37a are provided in electrode 37 to permit the escape of steam which flows from the cellular rubber during curing; condensation of this steam on the electrode 37 and its consequent dropping therefrom onto the cellular rubber would undesirably increase the tendency towards arcing across air space 40. Electrodes 36 and 37 are connected to an impedance matching unit 33 by means of conductors 38 and 39, respectively, in a manner similar to that shown in Fig. 2, and the impedance matching unit is connected to a source of high frequency electrical power (not shown) in the manner similar to that described in connection with Fig. 1. A radio frequency ammeter 41 may be placed in the load circuit for the purpose of indicating the match between the load circuit and the generator circuit.

For the purpose of explaining the operation of the specific invention in detail, the following example is presented for illustrative purposes only, all parts and proportions set out therein being in parts per weight.

*Example*

To 25 parts of a concentrated natural rubber latex containing 58% rubber content, there is added with stirring 0.65 part of a 50% water dispersion of sulfur and 0.13 part of 50% water dispersion of zinc diethyldithiocarbomate. The ammonia content of this mixture is reduced to 0.20%±0.02% by agitating the mixture slowly for 24 hours at 100° F., and allowing an air current to pass over the surface of the mixture. Thereafter 0.43 part of a zinc salt of mercaptobenzothiazole is uniformly mixed with the latex, and the latter is allowed to stand for 12 hours. The resulting mixture, which may be called the "masterbatch," is cooled to 55° F. and held at that temperature until needed for incorporation into the final frothed latex formula.

A portion of the above described master batch (1.09 pounds) is stirred, and the following ingredients are uniformly mixed therewith in the order they are named: 0.0445 pound of 6.05% solution of piperdinium pentamethylene-dithiocarbonate, 0.0166 pound of 35% solution of the potassium soap of castor oil, and 0.0580 pound of 10% solution of potassium oleate. The resulting mixture is beaten vigorously to form a froth, and the beating is continued to expand the froth to a density suitable for molding.

Near the end of the beating operation, gelling agents are added. The first gelling agent is a previously prepared 40 per cent aqueous dispersion of zinc oxide. A portion (0.0680 pound) of the zinc oxide dispersion is added during one-quarter minute, and the beating operation is continued for another three-quarters of a minute, during which a small increase in volume occurs. Immediately thereafter 12 ml. of a 25% aqueous solution of sodium silicofluoride are added during one-quarter minute, and the beating is continued until the volume of the form decreases to the volume desired for casting in the molds. The foam is then immediately poured into a mold, such as one of the molds illustrated in the accompanying drawings, and is allowed to stand therein a few minutes, until it has set to a stable, porous gel.

The mold is then subjected to a high frequency electrical field, in the manner previously described. For example, by the use of a 100 kilowatt high frequency generator operating at 13 megacycles, complete curing of the gelled froth is obtained in 6 minutes to produce 40 pounds (dry weight) of cured foamed latex sponge rubber. The curing operation is accompanied by the evolution of steam from the mold, but the cured cellular rubber is still wet.

The cured rubber article is removed from the mold, washed thoroughly in water, and then dried. Although the article may be dried in the conventional manner, by heating it for 16 to 24 hours in an air oven, the article may alternatively be dried or substantially dried by placing it between the electrodes of the electronic curing apparatus previously used for curing the cellular rubber. For example, some of the water may be removed from the cellular rubber by subjecting it to the same electrical field used in curing, for 1 to 3 minutes to raise the temperature to 212° F. Thereafter, the article may be dried completely in an oven in one or two hours.

The curing or vulcanizing process described above is not carried to the point where all the water is evaporated. Therefore, if the curing is performed on a water dispersion at atmospheric pressure, the temperature is automatically limited throughout the mass to approximately 212° F. Obviously, the temperature of vulcanization may be varied to correspond with the vapor pressure-temperature curve of any liquid which is contained in the cellular rubber by providing the means for maintaining pressure or vacuum about the electronic curing operation. If pressure is to be employed, to obtain higher vaporization temperatures, an inert gas instead of air should be used so as to keep oxidation of the rubber-like material to a minimum and to conserve the water or other vaporizable liquid contained in the sponge-like structure to such an extent that the curing operation may be completed while the material is completely wet. The presence of the water permits the heating and/or curing at lower frequencies than would be possible, if rubber alone were present. The temperature of the curing or vulcanization may be influenced to some extent with special chemicals which affect the vapor pressure of the water.

For example, in the vulcanization of aqueous neoprene dispersions which vulcanize at 300° F., it is necessary to maintain a pressure about the mass during vulcanization to prevent boiling off of the water before the vulcanization temperature is reached. This may be accomplished by enclosing the electrodes and mass to be vulcanized within a suitable pressure chamber 50 as illustrated in Fig. 4. The initial pressure may be created through the use of an inert gas admitted at a suitable pressure to the vessel through pipe 51 if there is not enough liquid present in the mass to generate this pressure. It will be readily apparent that a subatmospheric pressure could be maintained in chamber 50, by connecting the pipe 51 to a vacuum pump. The pressure may be increased gradually so as not to collapse the porous structure of the gelled mass. Another method of curing at such an elevated temperature above the normal boiling point of water may be accomplished by adding to the aqueous dispersions non-conducting materials which will increase the boiling point of the aqueous dispersions, for example ethylene glycol.

As disclosed by Dufour and Leduc in Patent 2,280,771, rubber, including latex rubber, may be vulcanized by subjecting it to the action of a high frequency electrical field between spaced electrodes. The frequency used ranges, for instance, between less than a megacycle and, for example, 10 megacycles and above. It has been determined that the vulcanization is thus brought about by molecular agitation accompanying the heating effect due to power absorption measured by loss factor, as above defined. It has been observed that the loss factor changes abruptly when the rubber mass has been treated for a brief period; for example, in certain latex compounds this has been found to be about five minutes. It has also been determined that this period of abrupt change in loss factor occurs at the time when optimum degree of vulcanization has been reached. This change in power absorption is indicated by corresponding change in the generator power output as illustrated graphically in Fig. 5.

A cellular rubber article produced as in the above example is characterized by the uniform physical properties resulting from the uniform cure of the rubber. It is found that the interior portions of the cellular rubber article are cured to the same extent as the surface portions thereof, and no portions are sticky (under-cured) or stiff (over-cured), as was often the case in vapor or gas curing processes formerly used.

It is found that the cellular rubber produced by employing this process has greater tensile strength, elasticity, tear resistance, aging qualities and resistance to permanent set. It is believed that this is due to a more efficient combination of sulphur with the rubber molecules, this being borne out by the fact that the better state of cure is obtained in a short time through the use of approximately only one-third the normal amounts of sulphur and accelerator used in the ordinary long time cure. Free sulphur in the cured product is substantially eliminated by this method, contributing to the aging qualities. Thus the superior degree and type of cure are believed to result from molecular activity produced by the high frequency current in addition to the heating effect on the rubber sulphur mixture. The degree of vulcanization produced electronically (through high frequency dielectric treatment) cannot be produced by the theoretical required quantity of ambient heat alone applied for the same period by ordinary vulcanization methods.

The very short time required for curing the article (from about 5 to 15 minutes) makes it possible to produce many times the quantity of cellular rubber articles previously possible with the use of conventional slower curing methods. This advantage, coupled with the fact that the present method makes it possible to produce cellular articles with little or no scrap, results in great economy.

Electronic curing by the method and apparatus just described may be applied with equal facility to the curing of unfrothed rubber or synthetic rubber latex. A product is obtained which is somewhat cellular but is more dense and does not have the characteristic sponge structure of the frothed latex product. It contains only water and no air or gas in the individual cells. Unfrothed latex is readily cured in the high frequency electrical fields, having a frequency of the order used to cure the frothed material. A gel of the latex may be obtained by adding to ordinary natural rubber or synthetic rubber latex in which has been dispersed a vulcanizing material, any suitable gelling agent such as, for example, those used in the preparation of the frothed latex gel, i. e., 40% aqueous dispersion of zinc oxide and 25% aqueous solution of sodium silicofluoride in similar weight proportions. These materials are merely stirred into the latex to give complete mixing. The mixture is then immediately poured into a mold before gellation begins.

Since by the present method wet cellular rubber or unfrothed rubber latex is cured in only a small fraction of the time previously required to cure the same compositions by means of hot water or steam, it is readily apparent that the present process accomplishes something more than merely heating the rubber. Probably an entirely different type of vulcanization occurs. This extremely rapid vulcanization characterizing the present process is unexpected, in view of the fact that heating is the only result predictable from placing a dielectric material between the electrodes of an electrical system operating at extremely high frequencies. The term "high frequency electrical field" is used to define the electromagnetic field as well as the electrostatic field which necessarily accompanies the high frequency current.

Modification may be resorted to and obvious changes may be made in the details of proportions and ingredients in the specific example mentioned, without departing from the spirit or scope of the invention, as covered by the appended claims.

What is claimed is:

1. The method of making a cellular rubber article which comprises frothing an aqueous dispersion of vulcanizable rubber, gelling said froth in the desired shape, subjecting the wet, gelled froth to a high frequency electrical field, and terminating the application of said field when an abrupt reduction in the absorption of power by said article occurs.

2. The method of making a cellular article which comprises frothing an aqueous dispersion of vulcanizable rubber, gelling the resulting froth, and subjecting the gelled froth to a high frequency electrical field to evaporate the liquid constitutents of said composition while subjecting said article to a controlled atmospheric pressure to regulate the boiling point of said liquid constituents, and terminating the application of said high frequency field when an abrupt reduction in the absorption of power occurs.

GEORGE P. BOSOMWORTH.

REFERENCES CITED

The following references are of record in the file of this patent:

UNITED STATES PATENTS

| Number | Name | Date |
|---|---|---|
| 1,828,481 | Trobridge et al. | Oct. 20, 1931 |
| 2,112,418 | Hart, Jr. et al. | Mar. 29, 1938 |
| 2,204,617 | Peel et al. | June 18, 1940 |
| 2,216,785 | Roberts | Oct. 8, 1940 |
| 2,261,847 | Dufour et al. | Nov. 4, 1941 |
| 2,280,771 | Dufour et al. | Apr. 28, 1942 |
| 2,293,851 | Rogers | Aug. 25, 1942 |
| 2,325,637 | Stewart | Aug. 3, 1943 |
| 2,339,607 | Smith | Jan. 18, 1944 |
| 2,384,982 | Walton et al. | Sept. 18, 1945 |
| 2,395,920 | Te Grotenhuis | Mar. 5, 1946 |
| 2,441,548 | Sperry | May 11, 1948 |

OTHER REFERENCES

Tech-Conference, article "The Applications of High-Frequency Currents in the Rubber Industry," London, May 1938. Pages 381 to 391. (Pre Print.)

Modern Plastics, "Plastic Molds for Electronic Vulcanizing," July 1946. Pages 142 to 145.